United States Patent [19]

Hiremath et al.

[11] Patent Number: 4,761,711

[45] Date of Patent: Aug. 2, 1988

[54] BARRIER LAYER CERAMIC DIELECTRIC CAPACITOR CONTAINING BARIUM PLUMBATE

[75] Inventors: Basavaraj V. Hiremath, Lawrenceville, N.J.; Robert E. Newnham, State College, Pa.; Leslie E. Cross, State College, Pa.; James V. Biggers, State College, Pa.

[73] Assignee: The United States of America as represented by the Secretary of the Navy, Washington, D.C.

[21] Appl. No.: 58,316

[22] Filed: Jun. 5, 1987

[51] Int. Cl.$^4$ .................... H01G 4/12; H01G 7/00; H01G 1/00; C04B 35/46

[52] U.S. Cl. .................... 361/321; 29/25.42; 264/61; 252/62.3 R; 501/136

[58] Field of Search .................... 252/62.3 BT; 501/136–138; 264/61; 357/10; 427/79, 80; 29/25.42; 361/320, 321

[56] References Cited

U.S. PATENT DOCUMENTS

| | | |
|---|---|---|
| 3,760,244 | 9/1973 | McClelland, Jr. .................... 317/258 |
| 4,072,780 | 2/1978 | Zillman .................... 361/321 X |
| 4,149,173 | 4/1979 | Schmelz et al. .................... 357/10 |
| 4,158,219 | 6/1979 | Payne et al. .................... 361/321 |
| 4,309,295 | 1/1982 | McSweeney .................... 252/62.3 BT |
| 4,311,729 | 1/1982 | Itakura et al. .................... 427/80 |
| 4,403,236 | 9/1983 | Mandai et al. .................... 252/62.3 BT |
| 4,503,482 | 3/1985 | Hennings et al. .................... 361/321 |
| 4,598,055 | 7/1986 | Hennings et al. .................... 501/136 X |
| 4,654,750 | 3/1987 | Kumagai .................... 361/321 |

OTHER PUBLICATIONS

"Some Properties of Thick Film Niobate Capacitors", Proced. of 1970 Electronic Components Conference, May 13-15, 1970, F. H. Edelman.

"New Barrier Layer Ceramic Capacitor" presented at Int'l Symposium on Appltns of Ferroelectrics, Jun. 8-11, 1986, Hiremath, Newham, Cross and Biggers.

Primary Examiner—Donald A. Griffin
Attorney, Agent, or Firm—Thomas E. McDonnell; Brian C. Kelly

[57] ABSTRACT

A barrier layer ceramic capacitor and a method of making the same, using barium plumbate or modified barium plumbate as the base material. The fabricating process is a one step process requiring a maximum sintering temperature of 1000° C.

15 Claims, 3 Drawing Sheets

BARRIER LAYER CERAMIC DIELECTRIC CAPACITOR CONTAINING BARIUM PLUMBATE

BACKGROUND OF THE INVENTION

1. Field of the Invention

The present invention relates to barrier layer ceramic capacitors and more particularly to grain boundary barrier layer ceramic capacitors including a ceramic composition in which the surfaces of the individual grains of a ceramic semiconductor are insulated with nonconductive material which is diffused into the ceramic.

2. Description of the Prior Art

It is known in the art that barrier layer ceramic capacitors may be fabricated by forming an insulating layer on the surface grains of semiconducting ceramics such as barium titanate ($BaTiO_3$), strontium titanate ($SrTiO_3$), and modified compositions of these titanates. These semiconducting ceramics are frequently doped with additions of various transition metals and rare earth elements to promote grain growth and to enhance the semiconductivity of the base ceramic material. Additionally, these dopants improve various electrical properties of capacitors so formed. Barrier layer ceramic capacitors are widely used because of their large apparent dielectric constant, small temperature coefficient of permittivity and small dielectric loss.

In order to produce barrier layer capacitors having large apparent dielectric constant (or permittivity) it is necessary to fire ceramic materials so that the semiconducting ceramic will have grain sizes ranging from 50–100 $\mu$m. To obtain discs of semiconducting ceramic, a two step process is often used. In the first step, a semiconducting ceramic composition is sintered and subsequently converted to a semiconducting state by heating in a reducing atmosphere. Then either the surface of the semiconducting disc is reoxidized, or an insulating oxide is diffused into the disc. Electrodes are then formed on the resultant disc to produce a capacitor. Unfortunately, the final capacitor, while exhibiting a desirable large permittivity also exhibits a low cut-off frequency.

It is known from Maxwell-Wagner dispersion theory that a decrease in the grain interior resistivity will shift the capacitance dispersion in the direction of higher frequency. Because of the higher conductivity of semiconducting strontium titanate ceramics than semiconducting barium titanate ceramics, the cut-off frequency of the barrier layer capacitors based on strontium titanate is ten times higher than that of capacitors based on barium titanate.

The present invention overcomes many of the disadvantages of prior art devices such as poor high frequency performance by providing an improved barrier layer capacitor device which incorporates a novel semiconducting ceramic material. The novel barrier layer ceramic capacitor according to the present invention is formed by a novel one-step process at a relatively low temperature which thereby produces an improved device at lower cost when compared to prior art devices.

SUMMARY OF THE INVENTION

Accordingly, one object of the invention is to provide a novel one step process for producing a barrier layer ceramic composition.

A second object is to provide a novel barrier layer ceramic containing barium plumbate or a modified barium plumbate composition.

A third object is to provide a novel capacitor device incorporating a novel barrier layer ceramic composition.

Yet another object is to produce a barrier layer ceramic capacitor with improved characteristics including large apparent dielectric constant, a low loss factor, a temperature stable coefficient of capacitance, high insulating resistance, high-cutoff frequency, and relatively low cost.

These and other objects and advantages are provided by a novel barrier layer ceramic capacitor according to the present invention which comprises a ceramic semiconducting layer of barium plumbate or modified barium plumbate having the formula: $Ba(Bi_xPb_{1-x})O_3$ for $0 \leq x \leq 25$ mole %; insulating layers formed by diffusing treated glass into the lattice of the semiconducting ceramic on opposing major surfaces thereof; and electrodes bonded to the insulating layers.

The novel ceramic material of the present invention is formed by a novel method which comprises the steps of preparing barium plumbate or modified barium plumbate ceramic wafers; sintering the wafers at 800°–1000° C.; forming insulating grain boundaries by coating the juxtaposed major surfaces with a glass compound and diffusing the glass into the lattice of the ceramic by heating the wafers; and applying electrodes to the major surfaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

on the left axis and the loss factor on the right axis, each with respect to temperature at a constant frequency of 1000 Hz.

Figure 3:
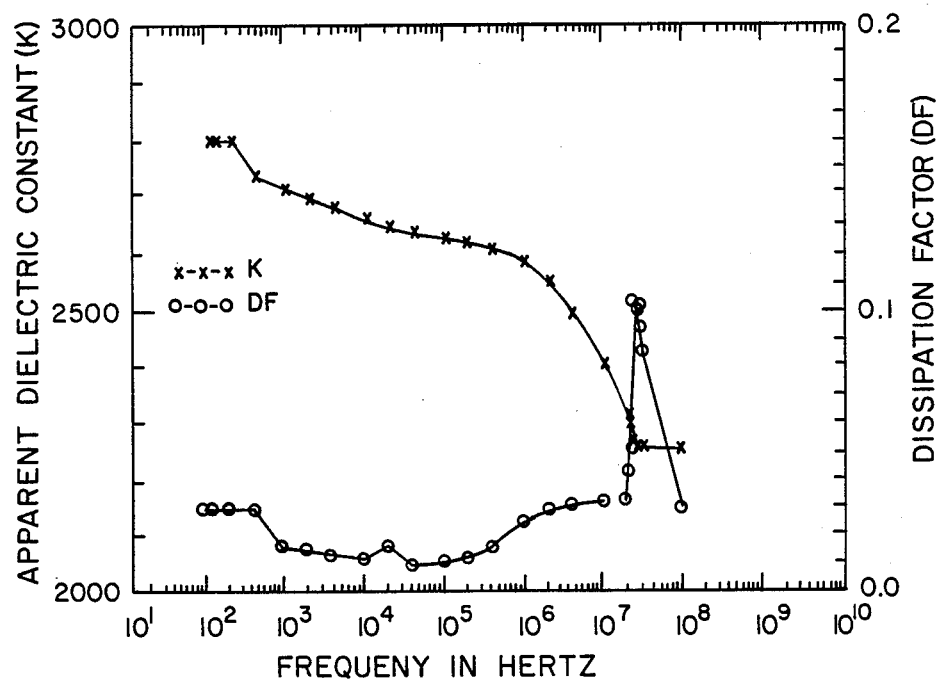
Figure 4:
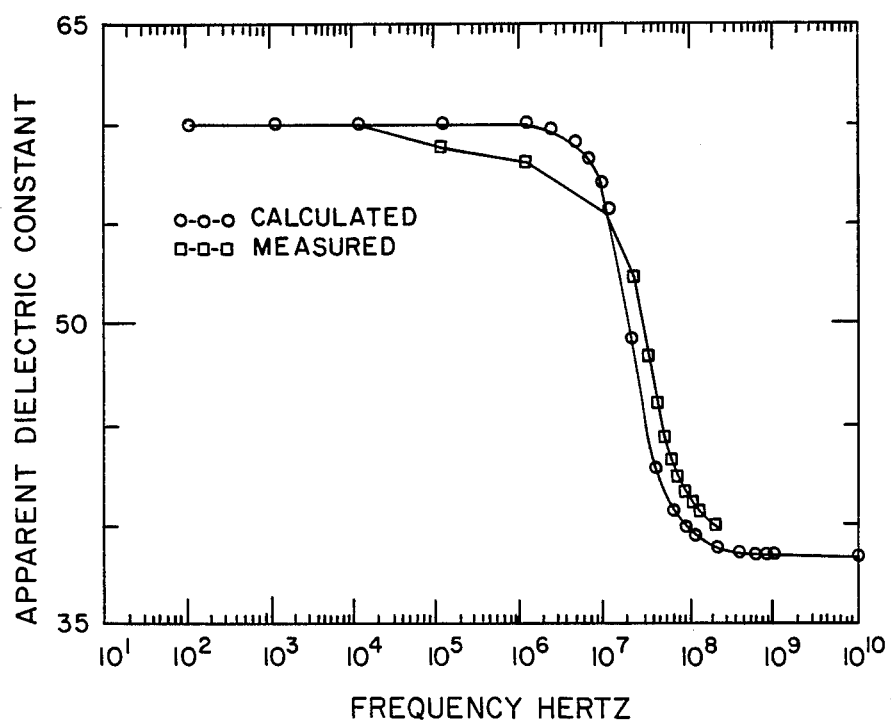
Figure 5:
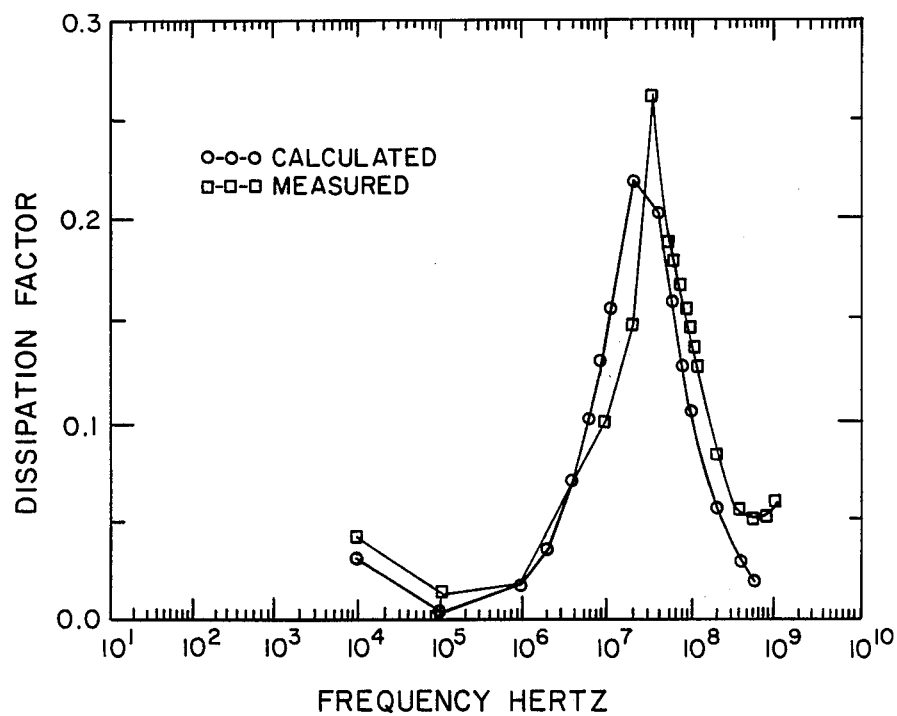

FIG. 3 shows a graph of some properties of a $Ba(Bi_{0.25}Pb_{0.75})O_3$ capacitor including the variation of apparent dielectric constant on the left axis and the loss factor on the right axis, each with respect to frequency at a constant room temperature;

FIG. 4 shows a graph of the variation of apparent dielectric constant with respect to frequency for a $BaPbO_3$ capacitor at a constant room temperature; and FIG. 5 shows a graph of the variation of dissipation factor with respect to frequency for a $BaPbO_3$ capacitor at a constant room temperature.

DETAILED DESCRIPTION OF THE INVENTION

Figure 1:
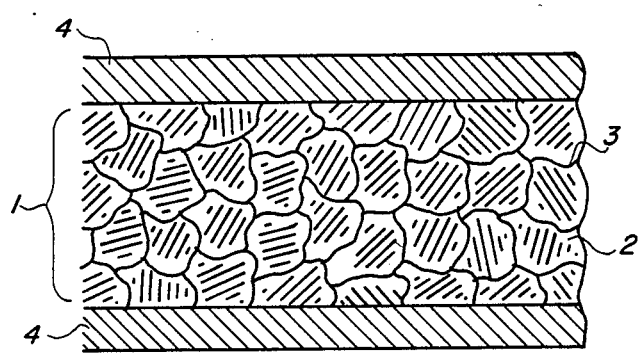
FIG. 1 shows a portion of a barrier layer ceramic capacitor wherein glass has been fully diffused into the boundary layers of a ceramic lattice and electrodes have been bonded to the surfaces.

Referring now to FIG. 1, a capacitor according to the present invention includes a semiconducting ceramic body 1 having major surfaces 5 and 6 and containing conducting grains 2, surrounded by insulating grain boundaries 3. These grain boundaries are formed by infusing an insulating glass from the major surfaces 5 and 6 of the wafer.

The body of the capacitor 1 (excluding electrodes) has a range of about 96.00 to about 99.96 wt % of conducting barium plumbate or a modified barium plumbate solid solution having the formula:

$Ba(Bi_xPb_{1-x})O_3$ for $0 \leq x \leq 25$ mole %.

The preferred range is about 97 to about 99.952 wt % of conducting modified barium plumbate solid solution and a most preferred embodiment includes about 99.952% of said solid solution. The remaining 0.05 to 4 wt % is a glass material marketed by Corning TM and known as EO TM glass containing lead, gallium, and bismuth which is fully diffused into the lattice of the boundary grains of the semiconducting ceramic.

The electrodes 4 can be formed on the ceramic body by known methods such as coating, dipping, or spraying a conductive substance on the major surfaces 5 and 6 of the ceramic body 1 after the glass has been diffused. In an alternative embodiment the electrodes can be formed on the body of the capacitor by vapor deposition techniques.

The method for making the capacitor generally includes the steps of preparing a barium plumbate or modified barium plumbate composition wafer; sintering the wafer at a temperature range of about 800° C. to about 1000° C., with a preferred range of about 850° C. to about 900° C., and a most preferred embodiment using about 900° C. for a time ranging from about 2 to about 24 hours with a most preferred time of about 24 hours; coating the wafer on its major surfaces with Corning EO TM glass or a suitable equivalent containing lead (Pb), gallium (Ga) and bismuth (Bi); heating the coated wafer at a temperature ranging from about 400° to about 900° C., with a preferred range of about 600° C. to about 690° C. and a most preferred temperature of about 690° C. for a diffusion time ranging from about 5 to about 120 minutes, with a preferred range of about 90 to about 120 minutes and in a most preferred embodiment a diffusion time of about 90 minutes to diffuse the glass into the grain boundary structure; and applying the electrodes by one of the methods described above.

More specifically the preparation of the barium plumbate or modified barium plumbate begins with the raw materials $BaCO_3$, PbO, and $Bi_2O_3$ which are combined as follows: a solid solution containing a range of about 46.5 to about 47 wt % $BaCO_3$, with a preferred range of about 46.6606 to about 46.93 wt % and a most preferred embodiment includes about 46.6606 wt % $BaCO_3$; a range of about 39.5 to about 53.1 wt % PbO, with a preferred range of about 39.6606 to 53.06 wt %, and a most preferred embodiment includes about 39.6606 wt % PbO; and a range of about 0.0 to about 14 wt % $Bi_2O_3$, with a preferred range of about 0.0 to about 13.7720 wt %, and a preferred embodiment includes about 13.7720 wt % $Bi_2O_3$. The materials are first weighed and mixed. The mixture is then milled for about 10 hours to obtain a homogeneous composition. The mixture is dried and calcined at a temperature range of about 600° to about 1050° C., with a preferred range of about 800° to about 1050° C., and a preferred embodiment uses a calcine temperature of about 800°, in an oxidizing atmosphere and for a time ranging from about 8 to about 10 hours, with a preferred embodiment using a calcine time of about 10 hours. The calcined powder is crushed, using mortar and pestle or other appropriate means. The powder is then ball-milled for about four hours, then dried. A resin (for example about 5 wt % polyvinyl acetate) is added as a binder which will be later evaporated out of the ceramic in the sintering process and the combination is sieved through a #100 mesh. The powder is formed into wafers 12.5 mm in diameter and 2 mm thick using a press to apply a pressure range of about 1000 to about 2500 $Kg/cm^2$, and in a preferred embodiment a pressure of about 2200 $Kg/cm^2$ is employed.

In a preferred embodiment the sintering is performed using a zirconia setter to lay the wafers upon. In another preferred embodiment the electrodes are applied by brushing a paste on the wafer and firing it at a temperature ranging from about 400° to about 550° C. for a few minutes.

A capacitor formed using the disclosed techniques has the temperature coefficient of capacitance characteristics of a Y5U commercial capacitor.

The above method can be called a one step process for fabricating the ceramic conducting composition because after sintering no further heating has to be done to convert the ceramic to a semiconducting state.

Figure 2:
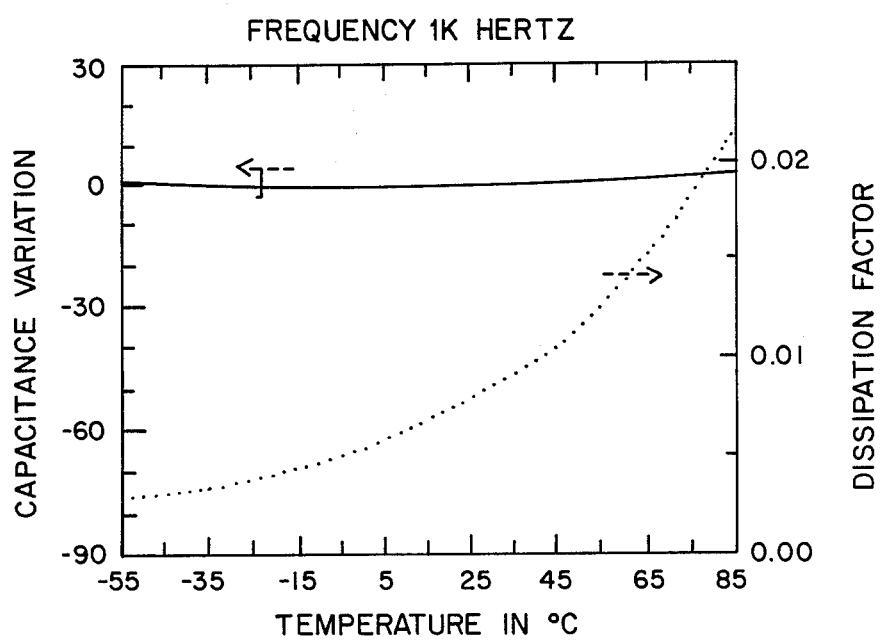
FIG. 2 shows a graph of some properties of a $Ba(Bi_{0.25}Pb_{0.75})O_3$ capacitor including the variation of capacitance $$\left( \frac{\Delta C}{C_{25°}} \times 100 \right)$$

FIGS. 2 and 3 graphically show some of the test results of the capacitor formed in the following example 1.

EXAMPLE 1

The conducting ceramic comprises a modified barium plumbate solid solution consisting of 46.6606 wt % $BaCO_3$, 39.6606 wt % PbO, and 13.7720 wt % $Bi_2O_3$ mixed and milled as described above and calcined at 800° C. for 10 hours. Then the powder is ball milled and sieved with resin and formed into wafers at about 2200 $Kg/cm^2$ pressure. The wafers were sintered at about 850° C. for 24 hours.

Afterward 0.048 wt % of EO TM glass was brushed on the major surfaces of the ceramic body and heated to about 690° C. for 90 minutes to diffuse the glass into the grain boundaries of the lattice. Finally electrodes were bonded on the wafer as described above. When tested the capacitor displayed the characteristics shown in the graphs of FIGS. 2 and 3.

FIG. 2 shows the low variation of capacitance as a function of temperature, and the relatively low dissipation values over the temperature range.

FIG. 3 shows the apparent dielectric and dissipation factor as a function of frequency over a range of frequencies. At 1 KHz the apparent dielectric constant was 2712 and the dissipation factor was 0.016. The insulation resistance for the capacitor was $4.7 \times 10^6$ ohms, and the cutoff frequency was $2 \times 10^7$ Hz.

FIGS. 4 and 5 graphically show calculated and test data for the barium plumbate capacitor formed in the following Example 2.

EXAMPLE 2

The conducting ceramic comprises a barium plumbate solid solution consisting of 46.93 wt % $BaCO_3$ and 53.06 wt % PbO, mixed and milled as described above and calcined at 1050° C. for 8 hours. Then the powder was ball milled and sieved and formed into wafers as in Example 1. The wafers were then sintered at 900° C. for 24 hours.

Afterward 3.0 wt % of EO TM glass was brushed on the major surfaces of the ceramic body and heated to 600° C. for 120 minutes to diffuse the glass into the grain boundaries of the lattice. Finally, electrodes were bonded as described above. When tested the capacitor displayed the characteristics shown in the FIGS. 4 and 5. FIG. 4 shows the apparent dielectric constant as a function of frequency. FIG. 5 shows the dissipation factor as a function of frequency. It is important to note that the maximum apparent dielectric constant only has a value of 60 which is over 400 times lower than the Bi modified barium plumbate ceramic. The insulation resistance was $5.0 \times 10^6$ ohms and the cut-off frequency was $2 \times 10^7$ Hz both similar to Example 1.

There has been disclosed a barrier layer ceramic capacitor device and a method for fabricating the same. Obviously, many changes and modifications are possible in light of the above teachings. It is therefore to be understood that within the scope of the appended claims the invention may be practiced other then as specifically described.

What is claimed and desired to be secured by Leters Patent of the United States is:

1. A barrier layer ceramic capacitor, comprising:
   a ceramic wafer having first and second major surfaces, said wafer having a grain structure;
   a first conducting layer bonded to said first major surface;
   a second conducting layer bonded to said second major surface;
   a glass compound diffused into the grain structure of said ceramic wafer to force a boundary layer insulator in boundary areas of said grain structure; and
   wherein said ceramic wafer comprises a solid solution of modified barium plumbate having the formula:

$Ba(Bi_xPb_{1-x})O_3$ $0 \leq x \leq 25$ mole %.

2. A barrier layer ceramic capacitor as described in claim 1, wherein said glass compound diffused into said ceramic wafer comprises a range of 4 to 0.05% by weight of said wafer after diffusion.

3. A barrier layer ceramic capacitor as described in claim 2, wherein said ceramic wafer comprises a barium plumbate ceramic.

4. A barrier layer ceramic capacitor as described in claim 1, wherein said glass compound comprises a mixture of Pb, Ga, and Bi.

5. A barrier layer ceramic capacitor as described in claim 1, wherein each said conducting layer comprises an electrode bonded to each of said first and second major surfaces by an electrode bonding means.

6. A barrier layer ceramic capacitor as described in claim 5, wherein said electrode bonding means is selected from the group consisting of: coating, dipping, spraying, and vapor deposition.

7. A method of producing a barrier layer ceramic of modified barium plumbate comprising the steps of:
   preparing a wafer of a ceramic composition having the formula:

$Ba(Bi_xPb_{1-x})O_3$ for $0 \leq x \leq 25$ mole %;

sintering said wafer;
   coating a first and a second surface of said sintered wafer with a glass compound;
   diffusing said glass into the grains of a boundary layer of said first and second surfaces of said wafer; and
   applying an electrode to each of said first and second surfaces of said glass coated wafer.

8. A method as described in claim 7 wherein said step of preparing a wafer of a ceramic material comprises the steps of:
   milling constituents of a modified barium plumbate into a homogeneous composition;
   calcining said composition in an oxidizing atmosphere;
   crushing said calcined composition into a fine powder;
   ballmilling said fine powder;
   mixing said ballmilled powder with a resin which will serve as a binder;
   drying said mixture;
   sieving said mixture; and
   pressing said mixture into wafer forms.

9. A method as described in claim 8, wherein said constituents comprise: a range of 46.5 to 47 wt % $BaCO_3$, a range of 39.5 to 53.1 wt % PbO, and a range of 0.0 to 14 wt % $Bi_2O_3$.

10. A method as described in claim 8, wherein said glass compound comprises a mixture of Pb, Bi and Ga.

11. A method as described in claim 8 wherein said step of calcining comprises heating said composition at a temperature of 600°–1050° C. for 8–10 hours.

12. A method as described in claim 8 wherein said step of sintering comprises:
   heating said wafer to a temperature of 800°–1000° C. for 2–24 hours.

13. A method as described in claim 8, wherein said step of diffusing comprises heating said glass coated wafers at a temperature of 400°–900° C. for 5 to 70 minutes.

14. A method as described in claim 8, wherein said step of applying an electrode comprises the steps of brushing a conducting paste on said first and said second surfaces of said wafer; and
   firing said wafer at 400°–550° C.

15. A method as described in claim 8, wherein said step of applying an electrode is accomplished by an electrode bonding means selected from the group consisting of: coating, dipping, spraying and vapor depositing.

* * * * *